(12) United States Patent
Macours et al.

(10) Patent No.: US 9,686,608 B2
(45) Date of Patent: Jun. 20, 2017

(54) SENSOR

(71) Applicant: NXP B.V., Eindhoven (NL)

(72) Inventors: Christophe Macours, Leuven (BE); Temujin Gautama, Leuven (BE)

(73) Assignee: NXP B.V., Eindhoven (NL)

( * ) Notice: Subject to any disclaimer, the term of this patent is extended or adjusted under 35 U.S.C. 154(b) by 99 days.

(21) Appl. No.: 14/476,180

(22) Filed: Sep. 3, 2014

(65) Prior Publication Data

US 2015/0110298 A1 Apr. 23, 2015

(30) Foreign Application Priority Data

Oct. 18, 2013 (EP) ..................................... 13189373

(51) Int. Cl.
| | |
|---|---|
| H04B 1/00 | (2006.01) |
| H04R 3/02 | (2006.01) |
| H04R 3/04 | (2006.01) |
| H04R 29/00 | (2006.01) |
| G01H 1/00 | (2006.01) |
| H04M 1/60 | (2006.01) |

(52) U.S. Cl.
CPC ................. *H04R 3/02* (2013.01); *G01H 1/00* (2013.01); *H04M 1/6016* (2013.01); *H04R 3/04* (2013.01); *H04R 29/001* (2013.01); *H04R 2460/01* (2013.01); *H04R 2460/15* (2013.01); *H04R 2499/11* (2013.01)

(58) Field of Classification Search
CPC .......... H04R 3/02; H04R 3/04; H04R 29/001; H04R 2460/15; H04R 2499/11; H04R 2460/01; G01H 1/00; H04M 1/6016
See application file for complete search history.

(56) References Cited

U.S. PATENT DOCUMENTS

| | | |
|---|---|---|
| 6,252,968 B1 | 6/2001 | Narasimhan et al. |
| 6,639,987 B2 | 10/2003 | McIntosh |
| 6,658,110 B1 | 12/2003 | Andersen |

(Continued)

FOREIGN PATENT DOCUMENTS

| | | |
|---|---|---|
| CN | 102461206 A | 5/2012 |
| EP | 2 190 213 A1 | 5/2010 |

OTHER PUBLICATIONS

Chopra, V. "Active Leak Compensation in Small-Sized Loudspeakers Using Digital Signal Processing", Convention Paper 6605, J. of AES, 1-6 pgs. (Oct. 2005).

(Continued)

*Primary Examiner* — Andrew L Sniezek
(74) *Attorney, Agent, or Firm* — Rajeev Madnawat

(57) ABSTRACT

An acoustic coupling sensor 200 for a portable electronic device is described which includes an acoustic transmitter 22, a reference signal generator 20 coupled to the acoustic transmitter, and an acoustic sensor 24 wherein in operation, the reference signal generator is operable to transmit the reference signal to the acoustic transmitter, to detect an acoustic level of the transmitted reference signal via the acoustic sensor, and wherein the detected reference signal level corresponds to a value of acoustic coupling between the acoustic transmitter and the acoustic sensor. The acoustic coupling sensor may be used for example in a mobile phone to detect acoustic leakage in order to adapt the acoustic level in the mobile phone during use.

21 Claims, 5 Drawing Sheets

(56) References Cited

U.S. PATENT DOCUMENTS

| | | |
|---|---|---|
| 6,788,798 B1 | 9/2004 | Backman |
| 8,218,779 B2 | 7/2012 | Isberg |
| 8,649,526 B2 * | 2/2014 | Vernon ............... G10K 11/1782 381/71.1 |
| 2001/0014161 A1 | 8/2001 | Baiker et al. |
| 2002/0028699 A1 | 3/2002 | Moquin et al. |
| 2004/0184623 A1 | 9/2004 | Johannsen et al. |
| 2010/0246855 A1 | 9/2010 | Chen |
| 2010/0322430 A1 | 12/2010 | Isberg |
| 2011/0002474 A1 * | 1/2011 | Fuller ................ G10K 11/1782 381/71.6 |
| 2012/0243698 A1 * | 9/2012 | Elko .................... H04M 9/082 381/66 |
| 2013/0201796 A1 * | 8/2013 | Onishi .................. H04R 17/00 367/99 |

OTHER PUBLICATIONS

ETSI Universal Mobile Telecommunications System (UMTS); LTE; Terminal Acoustic Characteristics for Telephony; Requirements (3GPP TS 26.131 version 8.3.0 Release 8), 1-29 pgs. (Apr. 2011).

Extended European Search Report for EP Patent Appln. No. 13189373.7 (Mar. 17, 2014).

\* cited by examiner

SENSOR

CROSS-REFERENCE TO RELATED APPLICATIONS

This application claims the priority under 35 U.S.C. §119 of European patent application no. 13189373.7, filed on Oct. 18, 2013, the contents of which are incorporated by reference herein.

FIELD OF INVENTION

The invention relates to an acoustic coupling sensor for a portable electronic device.

BACKGROUND

Handset mobile telephony or headphone playback require a loudspeaker to be placed close to (or inside) the listener's outer ear. This results in an acoustic coupling between the loudspeaker and the ear that strongly influences the acoustical pressure at the eardrum and consequently the perceived sound quality.

In the specific case of a handset mobile phone, the amount of acoustic coupling is not fixed and varies with the force manually applied to the mobile phone against the ear by the user. As the force applied becomes stronger, the sealing or fit of the loudspeaker to the ear improves which may result in reducing or lowering the acoustic leakage which in turn may improve the low frequency sound reproduction.

FIG. 1 illustrates the transfer function 100 of an existing mobile phone loudspeaker measured on a Head and Torso Simulator (HATS) for different application forces. The y-axis shows the relative sound pressure level in decibels and the x-axis shows the frequency ranging from 100 Hz to 10,000 Hz. The transfer function of the loudspeaker is illustrated for four conditions shown in lines 10, 12, 11 and 16 respectively. As the fit of the loudspeaker to the listener's ear becomes tighter, the level of the frequency response increases at low frequencies. Graph line 16 for example shows the situation where the fit of the loudspeaker to a listener's ear is relatively loose and line 10 of the frequency response shows the condition where the loudspeaker is a tight fit.

The variation of acoustic leakage while a mobile phone is in use can have an adverse effect on the sound quality perceived by the user.

Two main techniques exist to minimize the impact of leakage on the acoustic response of the speaker. Firstly, leak tolerant acoustical designs as described for example in U.S. Pat. No. 6,658,110 B1 and U.S. Pat. No. 6,788,798 B1. Leak tolerant acoustical designs may minimize the effect of leakage on the total acoustic load of the loudspeaker by introducing controlled acoustical paths. However they require a complex loudspeaker housing to reduce the adverse impact of acoustic leakage. Secondly a dedicated sensor in close proximity to the loudspeaker as described in U.S. Pat. No. 6,639,987B2 may be used to detect the amount of acoustic leakage while the mobile phone is in use and then equalize the audio signal accordingly.

SUMMARY OF INVENTION

Various aspects of the invention are defined in the accompanying claims. In a first aspect there is defined an acoustic coupling sensor for a mobile device, the acoustic coupling sensor comprising: a acoustic transmitter, a reference signal generator coupled to the acoustic transmitter, a acoustic sensor, a level detector coupled to the acoustic sensor, wherein in operation, the reference signal generator is operable to transmit the reference signal to the acoustic transmitter, the acoustic transmitter is operable to transmit the reference signal and the acoustic sensor is operable to detect an acoustic level of the transmitted reference signal.

By using a reference signal, the change in the acoustic path between the acoustic transmitter and acoustic sensor can be tracked with sufficient accuracy to determine a change in acoustic coupling or acoustic leakage conditions. The position of the acoustic sensor with respect to the acoustic transmitter is not critical, provided the position remains fixed during the sensor operation.

In embodiments the acoustic coupling sensor further comprises a level detector coupled to the acoustic sensor wherein the level detector is operable to detect an acoustic level of the transmitted reference signal via the acoustic sensor, and wherein the detected reference signal level corresponds to a value of acoustic coupling between the acoustic transmitter and the acoustic sensor.

The level detector may extract the reference signal from other signals detected by the acoustic sensor by, for example, filtering or other signal processing operations.

In embodiments the reference signal generator is configured to generate a band-limited signal having a frequency greater than typically one octave above the resonant frequency of the acoustic transmitter. The restriction of reference frequencies to frequency values which are significantly greater than the resonant frequency of the acoustic transmitter may eliminate the effect of any mechanical coupling between the acoustic transmitter and acoustic sensor on the detection process.

In embodiments the reference signal generator is configured to generate a band-limited ultrasound signal. For audio applications, the use of an ultrasound signal avoids any impact on the audio experienced by a user.

Embodiments of the acoustic transmitter may comprise a loudspeaker or a piezoelectric transducer.

Embodiments of the acoustic sensor may comprise a microphone or a piezoelectric transducer.

Embodiments of the acoustic coupling sensor having a loudspeaker may be included in an audio apparatus comprising a mixer coupled to a processor and the reference signal generator, and wherein the processor is further operable to output an audio signal and the audio apparatus is operable to output a mix of the audio signal and the reference signal via the loudspeaker.

In an embodiment of the audio apparatus the processor is configured to adapt at least one of the gain, equalization, and dynamic range compression (DRC) of the audio signal in response to a change in the acoustic coupling value.

The audio apparatus may dynamically adapt the audio signal gain and/or equalization to make the acoustic output experienced by the user less dependent on the acoustic leakage.

Embodiments of the acoustic coupling sensor may be included in a portable electronic device such as a mobile phone wherein in a voice communication mode of operation, the loudspeaker is operable as a receiver speaker and the microphone is operable for speech input.

The acoustic coupling sensor may be implemented in a portable electronic device such as a mobile phone, Smartphone, table computer, cordless phone, or headset without using dedicated sensor components.

In embodiments, the acoustic coupling sensor may comprise one or more additional microphones. Additional microphones may be used to improve the reliability of detection of the acoustic coupling.

In a second aspect, there is described a method for detecting acoustic coupling in a portable electronic device, the method comprising the steps of generating a reference signal, transmitting the reference signal through an acoustic transmitter, detecting a reference signal level via an acoustic sensor, the detected reference signal level corresponding to a value of acoustic coupling between the acoustic transmitter and the acoustic sensor.

Embodiments of the invention are now described in detail, by way of example only, illustrated by the accompanying drawings in which.

DESCRIPTION

Figure 1:
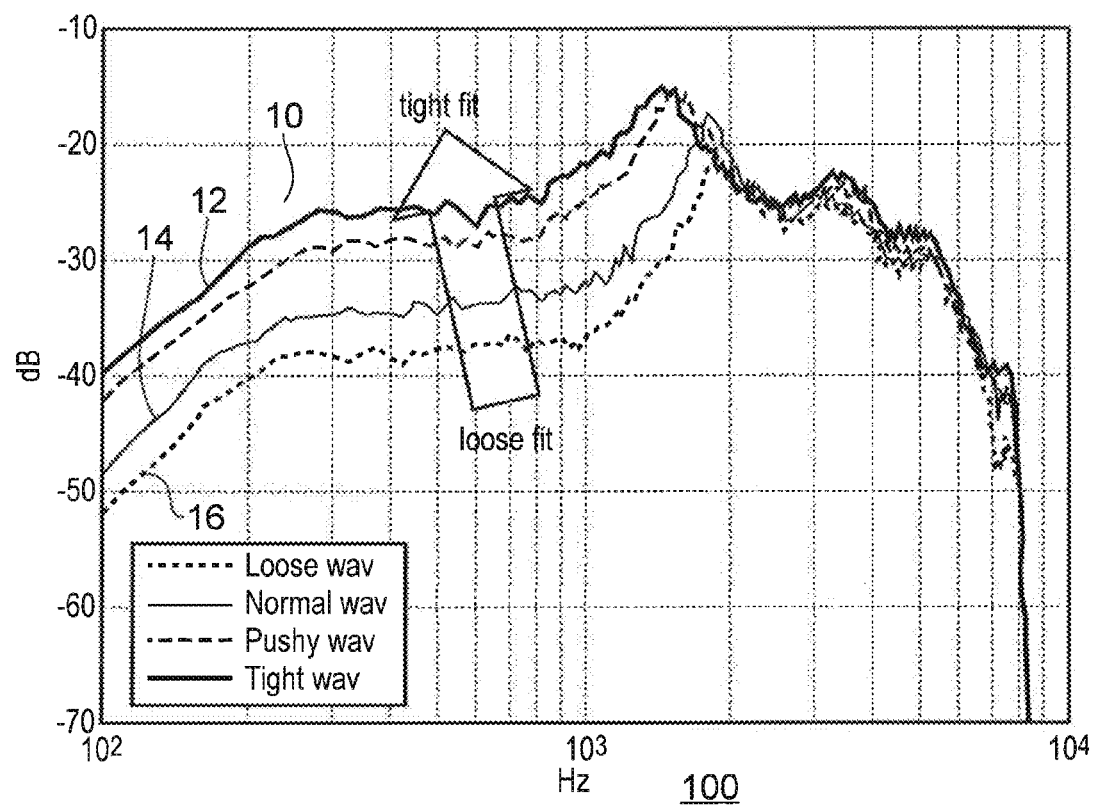
FIG. 1 illustrates the transfer function 100 of an existing mobile phone receiver speaker measured on a Head and Torso Simulator (HATS) for different application forces.
Figure 2:
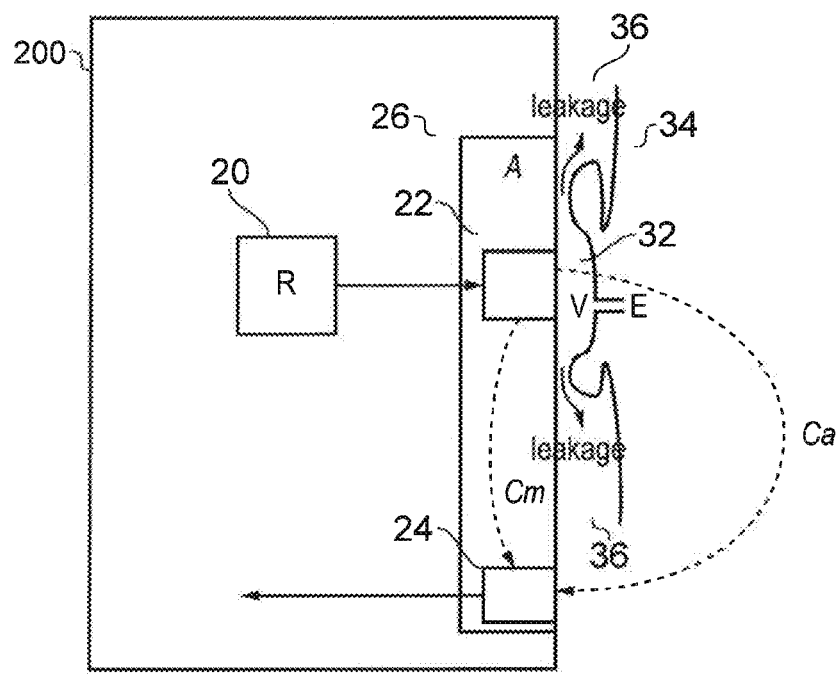
FIG. 2 illustrates an acoustic coupling sensor according to an embodiment.

FIG. 2 shows an acoustic coupling sensor 200. A reference signal generator 20 may be connected to an acoustic transmitter 22. Acoustic transmitter 22 and acoustic sensor 24 may be mounted on a housing 26. Acoustic sensor 24 may be in a fixed position with respect to acoustic transmitter 22. The distance between acoustic transmitter 22 and acoustic sensor 24 may be fixed at a distance so that the acoustic sensor 24 can detect an acoustic output from the acoustic transmitter 22. The positioning between the acoustic transmitter 22 and the acoustic sensor 24 is not important provided the distance remains fixed while the sensor 200 is in operation.

In operation when the acoustic transmitter 22 of the acoustic coupling sensor 200 is placed against, for example, the ear of a user 34, an acoustic volume 32 may be formed, as well as leakage channels 36 that depend on the force applied to the device and the listener's individual ear shape. The acoustical transfer function Ca between the acoustic transmitter 22 and the acoustic sensor 24 may change to reflect the change in coupling due to the shadowing effect of the ear 34 placed against the acoustic transmitter 22. The change in the acoustic coupling value may be detected by the acoustic sensor 24. The reference signal generator 20 may be implemented in hardware, software which may for example by executed on a digital signal processor, or a combination of hardware and software.

By using a reference signal, whose characteristics are known, the positioning of the acoustic sensor 24 with respect to the acoustic transmitter 22 is not critical, provided that the position remains fixed during use. The skilled person will appreciate that the acoustic coupling level under varying conditions may be calibrated. The reference signal generator may generate a single frequency or a range of band limited frequencies. The reference signal may be continuous or transmitted intermittently. The reference signal may comprise a single pilot tone or number of pilot tones or a band-limited noise signal. The reference signal may be constant amplitude.

The skilled person will appreciate that the position of the acoustic sensor 24 may be moved with respect to the acoustic transmitter 22 provided the relative position of the acoustic sensor 24 and the acoustic transmitter 22 remain fixed during operation. The acoustic transmitter may be for example a loudspeaker or a piezoelectric transducer. The acoustic sensor may be for example a microphone or a piezoelectric transducer.

Figure 3:
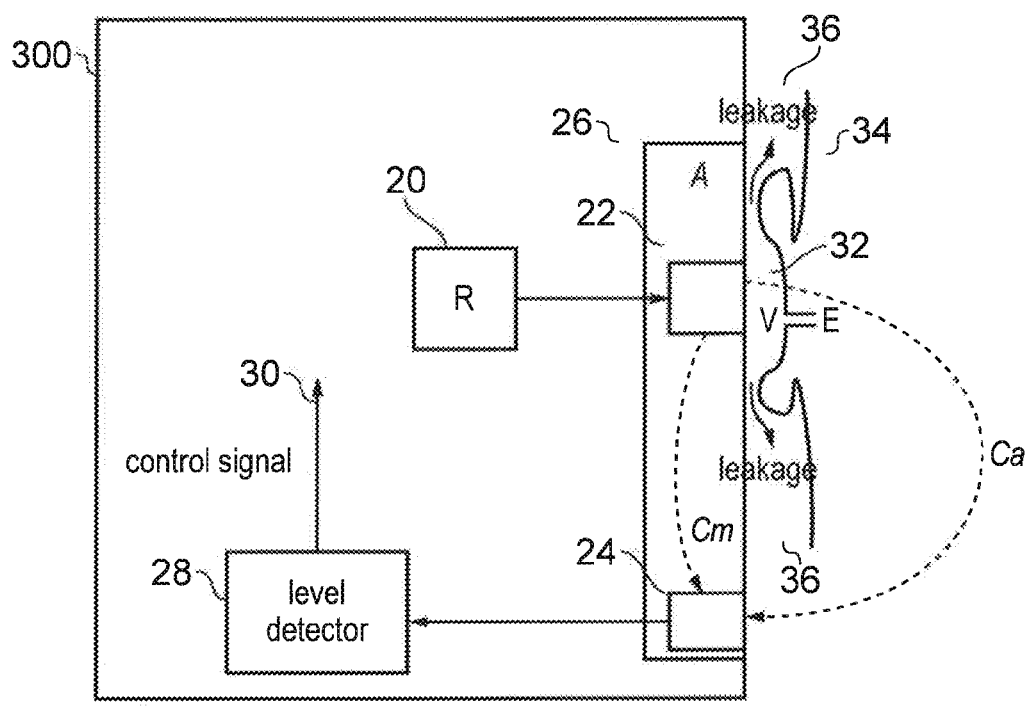
FIG. 3 shows an acoustic coupling sensor according to an embodiment.

FIG. 3 shows an acoustic coupling sensor 300. A reference signal generator 20 may be connected to an acoustic transmitter 22. Acoustic sensor 24 may be connected to a level detector 28. Acoustic transmitter 22 and acoustic sensor 24 may be fixed on a housing 26. Acoustic sensor 24 may be in a fixed position with respect to acoustic transmitter 22. The distance between acoustic transmitter 22 and acoustic sensor 24 may be fixed at a distance so that the acoustic sensor can detect an acoustic output from the acoustic transmitter 22. The positioning between the acoustic transmitter 22 and the acoustic sensor 24 is not important provided the distance remains fixed while the sensor 200 is in operation.

In operation when the acoustic transmitter 22 of the acoustic coupling sensor 200 is placed against, for example, the ear of a user 34, an acoustic volume 32 may be formed, as well as leakage channels 36 that depend on the force applied to the device by the listener and the listener's individual ear shape. The acoustical transfer function Ca between the acoustic transmitter 22 and the acoustic sensor 24 may change to reflect the change in coupling due to a so-called shadowing effect of the ear 34 placed against the acoustic transmitter 22. The change in the acoustic coupling value may be detected by the acoustic sensor 24 and the level detector 28 can analyze the reference signal level change with respect to a known level to determine an acoustic coupling value and consequently a measure of the leakage in the leakage channels 36. The reference signal generator 20 and the level detector 28 may be implemented in hardware, software which may for example by executed on a digital signal processor, or a combination of hardware and software.

The skilled person will appreciate that the level detector 28 may be calibrated to determine the levels corresponding to a maximum acoustic coupling between the acoustic transmitter 22 and the acoustic sensor 24 when the relative positions of the acoustic sensor 24 and the acoustic transmitter 22 are set to their operating location. The position of the acoustic sensor 24 may be outside the acoustic volume 32 formed between the acoustic transmitter and an external surface when in use.

The coupling between acoustic transmitter 22 and the acoustic sensor 24 may consist of an acoustical component (Ca) and a mechanical component (Cm). The mechanical coupling component is due to internal mechanical vibrations triggered by the moving part of the acoustic transmitter and may be particularly significant at low frequencies where the displacement of the moving part of the acoustic transmitter may be the largest.

Figure 4:
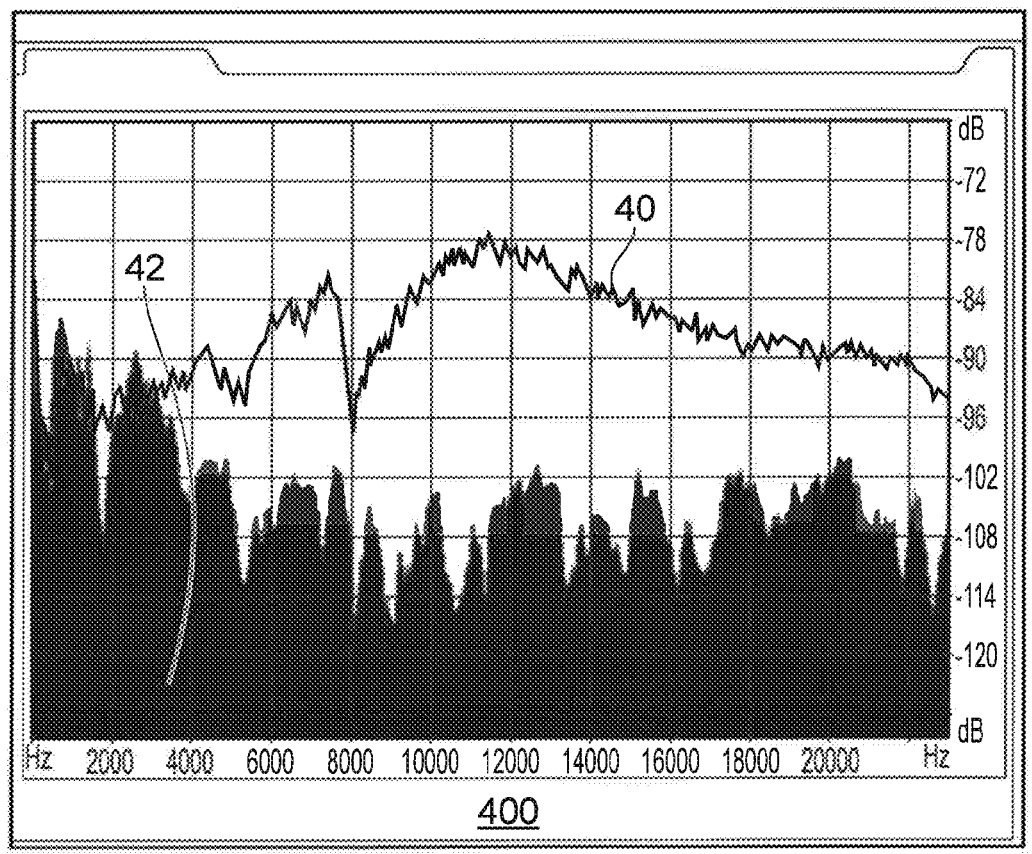
FIG. 4 shows a graph of the variation of coupling between the microphone and loudspeaker of the embodiment of FIG. 2 for a reference signal consisting of white noise.

FIG. 4 shows a graph 400 of the frequency spectrum captured by the acoustic sensor 24 when playing white noise on the acoustic transmitter 22 for free-field or no coupling conditions 40 and tight coupling conditions 42. The x-axis varies from 0 Hz to 23 kHz and the y axis shows the relative sound pressure level in decibels. It can be seen that frequencies above 3 kHz are strongly attenuated where the mechanical coupling (Cm) becomes negligible compared to the acoustic coupling (Ca). For a band limited reference signal with a frequency of greater than 3 kHz, the effects of mechanical coupling of the acoustic transmitter on the acoustic sensor 24 may be considered negligible. Hence, the variation of the detected reference signal for frequencies above 3 kHz may be considered to be due to the acoustic coupling component Ca only for the example acoustic transmitter 22.

More generally, mechanical coupling may be negligible for frequencies one or more octaves above the acoustic transmitter resonance frequency. Hence for some acoustic transmitters, the effect of mechanical coupling may start to become negligible at frequencies lower than 3 KHz.

Figure 5:
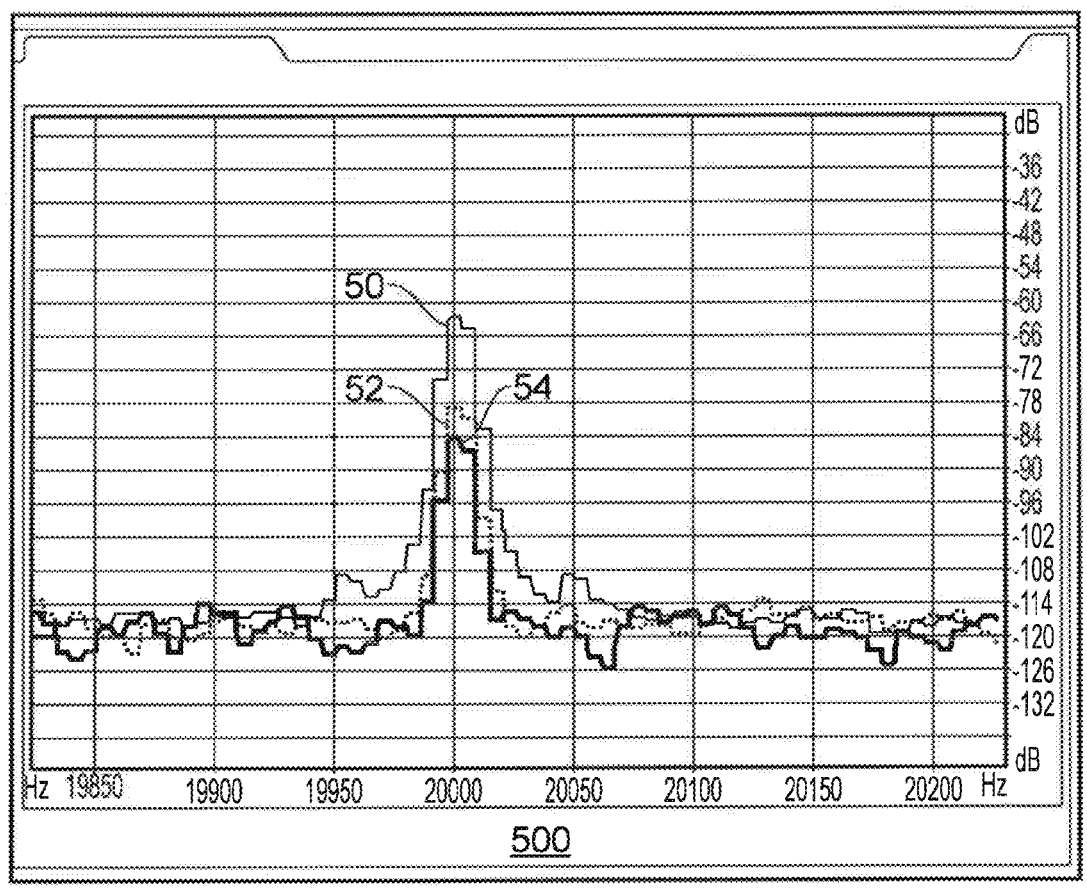
FIG. 5 illustrates a graph showing the variation of acoustic coupling with a reference signal of 20 KHz for the sensor of FIG. 2.

FIG. 5 shows a graph 500 illustrating the frequency spectrum of the acoustic sensor input when playing a 20 kHz tone through the acoustic transmitter and different leakage conditions. The frequency varies between 19.8 kHz and 20.2 kHz on the x-axis and the y axis shows the relative sound pressure level in decibels. Line 54 shows the response for a tight fit between the acoustic transmitter and the human ear. Lines 52 and 54 show increased acoustic coupling between the acoustic transmitter 22 and the acoustic sensor 24 as the leakage increases. The value of the acoustic coupling Ca between the acoustic transmitter and the acoustic sensor may therefore be considered to be a measure of the amount of acoustic leakage between the acoustic transmitter and a surface acoustically coupled to the acoustic transmitter.

Figure 6:
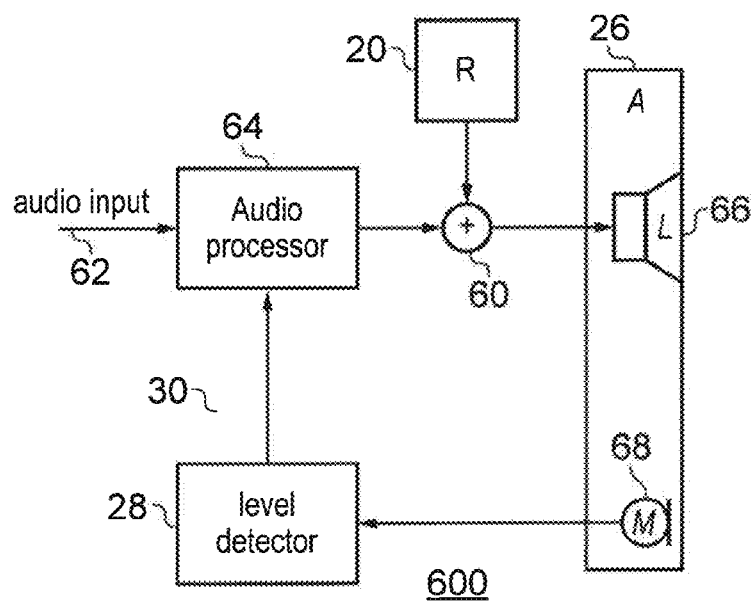
FIG. 6 shows an audio system according to an embodiment.

FIG. 6 shows an audio system 600 including an acoustic coupling sensor. A reference signal generator 20 may be connected to a first input of a mixer 60. An audio processor 64 may be connected to an audio input 62. An output of audio processor 64 may be connected to a second input of the mixer 60. An output of the mixer may be connected to a loudspeaker 66. A microphone 68 may be connected to an input of a level detector 28. An output of the level detector 30 may be connected to an input of the audio processor 64. Loudspeaker 66 and microphone 68 may be fixed on a housing 26. Microphone 66 may be in a known position with respect to loudspeaker 68. The distance between loudspeaker 66 and microphone 68 may be fixed so that the microphone can detect an acoustic output from the loudspeaker 66. The positioning between the loudspeaker 66 and the microphone 68 is not important provided the distance remains constant during the operation of audio system 600.

In operation, the audio signal which may for example contain speech or music may be mixed with the reference signal by mixer 60. The output of the mixer carrying the combined audio and reference signal may be acoustically transmitted by the loudspeaker 66. The acoustic output of the loudspeaker 66 including the transmitted reference signal may be detected by the microphone 68 and the level detector 28. The level detector 28 may convert the analog signal from the microphone 68 to a digital signal and extract characteristics of the reference signal such as frequency and/or amplitude by digital filtering or other operations known to the skilled person. The output of the level detector 28 may indicate a value of acoustic coupling between the loudspeaker 66 and the microphone 68. The variation of acoustic coupling value as the loudspeaker is brought into contact with for example a user's ear may indicate the amount of acoustic leakage between the loudspeaker and the ear as explained in FIG. 3 and FIG. 4. The reference signal may typically be an ultrasound band limited signal, for example above 20 KHz since it is not desirable for the reference signal to be heard by the user of the audio system 500.

The acoustic coupling or acoustic leakage value may be used to control the equalization of the audio signal via level detector control output 30. The audio processor 64 may adapt the audio signal received from audio input 62 to adapt the equalization, or volume level of the loudspeaker output in response to a change in the detected acoustic coupling value between the receiver speaker 22 and the microphone 24. Since the acoustic coupling value between the may correspond to the amount of acoustic leakage between the ear of a user and the loudspeaker 22, the skilled person will appreciate that the audio system may adapt the audio signal such that the acoustic pressure at the eardrum of a user is independent of the amount of acoustic leakage. The adaptation of the audio signal may be a gain increase or decrease. The adaptation of the audio signal may be an adaptation of the equalization or frequency dependent gain.

Figure 7:
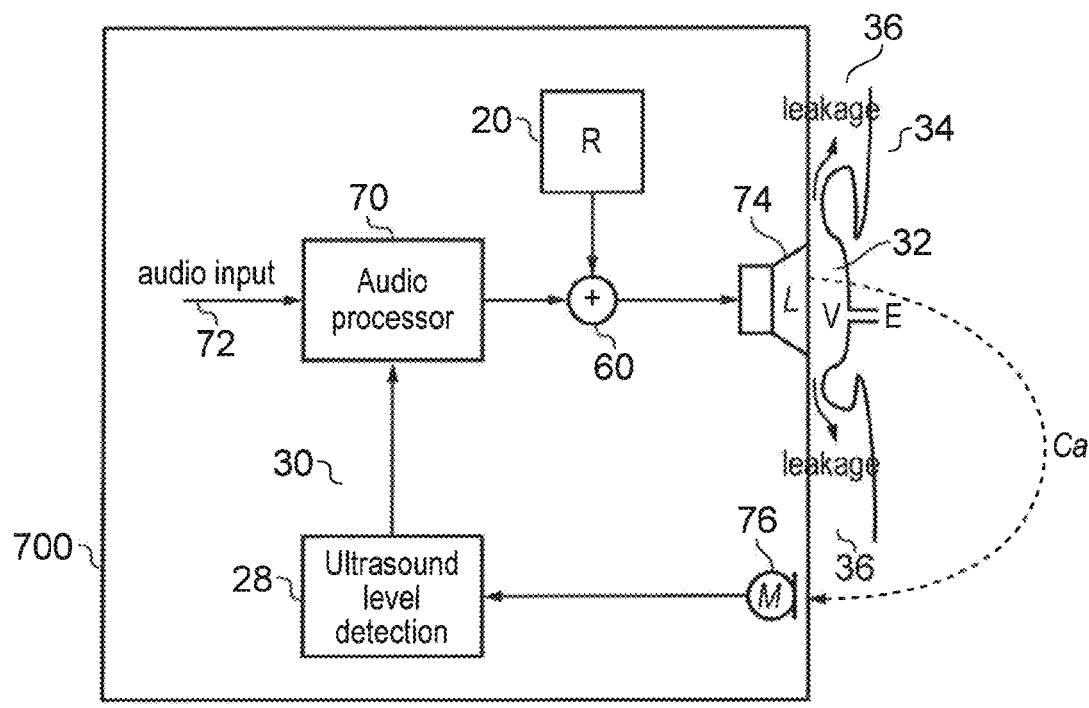
FIG. 7 shows a portable electronic device according to an embodiment.

FIG. 7 shows a mobile phone 700 according to an embodiment. A reference signal generator 20 may be connected to a first input of a mixer 60. An audio processor 70 may be connected to an audio input 72. An output of audio processor 70 may be connected to a second input of the mixer 60. An output of the mixer may be connected to the receiver speaker 74. A handset microphone 76 may be connected to an input of a level detector 28. A control output 30 of the level detector 28 may be connected to an input of the audio processor 70. Receiver speaker 74 and microphone 76 may be housed in the mobile phone 700 such that receiver speaker 74 is in a fixed position with respect to microphone 76. The microphone 76 may be connected to an audio codec for speech input processing (not shown). Audio processor 70 may have a further audio input 72.

In operation when the receiver speaker 74 of the mobile phone 700 is placed against, for example, the ear of a user 34, an acoustic volume an acoustic volume 32 may be formed, as well as leakage channels 36 that depend on the force applied to the device and the listener's individual ear shape. The transfer function Ca may change to reflect the change in acoustic coupling due to the so-called shadowing effect of the ear 34 placed against the receiver speaker 74. The change in the acoustic coupling value may be detected by the microphone 76 and the level detector 28 may compare the reference signal level change with respect to a known level to determine an acoustic coupling value and consequently a measure of the acoustic leakage in the leakage channels 36.

An audio signal which may for example be speech or music may be mixed with the reference signal by mixer 60. The output of the mixer carrying the combined audio and reference signal may be transformed into an acoustic output by the receiver speaker 74. The acoustic output transmitted by the receiver speaker 74 may be detected by the microphone 76 and the level detector 28. The level detector 28 may convert the analog signal from the microphone 76 to a digital signal and extract characteristics of the reference signal such as frequency and/or amplitude by digital filtering or other operations known to the skilled person. The output 30 of the level detector 28 indicates a value of acoustic coupling between the receiver speaker 74 and the handset microphone 76. The reference signal may typically be an ultrasound band limited signal, for example above 20 KHz, so that the reference signal cannot be heard by the user of the mobile phone 700. The skilled person will appreciate that audio processor 70 may adapt the equalization to acoustic output so that the sound experienced by the user is independent of the acoustic leakage. Consequently the user of the mobile phone 700 may not have to apply a constant pressure to the handset against the ear to experience a consistent sound quality.

The skilled person will appreciate that when the mobile phone 700 is being used for conventional phone calls, the microphone 76 may be the main speech input device for the mobile phone. Consequently the acoustic leakage sensor may be implemented without any additional dedicated sensor components by making use of normally undesirable acoustic coupling between the receiver speaker 74 and the speech input microphone 76. For audio playback modes of operation, the microphone 76 may be used solely to detect the reference signal transmitted by the receiver speaker 74.

Figure 8:
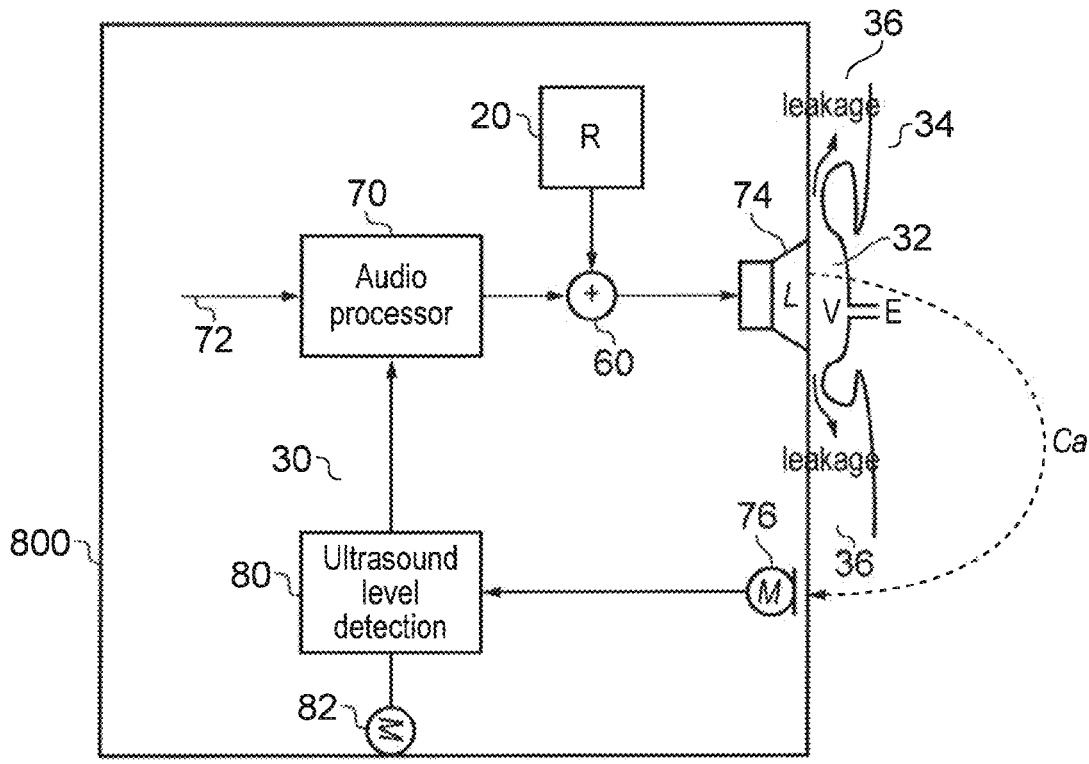
FIG. 8 illustrates a portable electronic device according to an embodiment.

FIG. 8 shows a mobile phone 800. A reference signal generator 20 may be connected to a first input of a mixer 60. An audio processor 70 may be connected to an audio input 72. An output of audio processor 70 may be connected to a second input of the mixer 60. An output of the mixer may be connected to the receiver speaker 74. A handset microphone 76 may be connected to an input of a level detector 80. A control output 30 of the level detector 80 may be connected to an input of the audio processor 70. Receiver speaker 74 and microphone 76 may be housed in the mobile phone 800 such that receiver speaker 74 is in a fixed position with respect to microphone 76. Audio processor 70 may have a further audio input 72. A further microphone 82 may be connected to a second input of level detector 80. The operation of the mobile phone 800 may be similar to mobile phone 700. The additional microphone 82 may also be acoustically coupled to the receiver speaker 74. Level detector 80 may combine the input signals of microphone 76 and further microphone 82 and extract parameters indicating a measure of acoustic coupling between the receiver speaker 74, the microphone 76 and the further microphone 82. Using an additional microphone 82 may give a more robust indication of the acoustic leakage between the speaker and the ear of a user 32 when in use.

The skilled person will appreciate that the additional microphone 82 may be used for other functions within a mobile phone such as active noise cancellation. Hence the acoustic coupling sensor may be implemented without dedicated sensor components.

Figure 9:
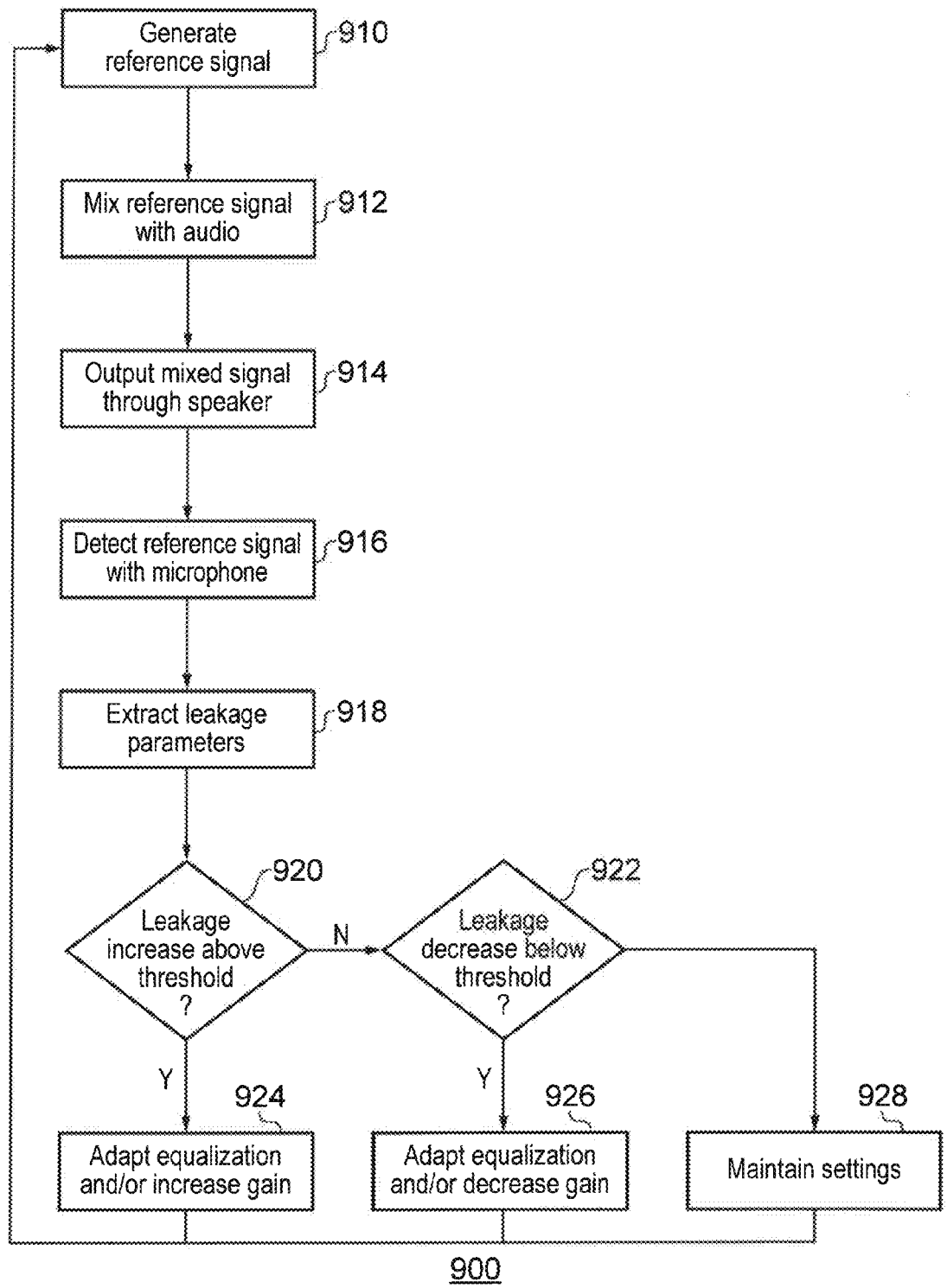
FIG. 9 shows a method of detecting acoustic leakage and adapting the audio output according to an embodiment.

FIG. 9 shows an exemplary method of acoustic leakage sensing for a portable electronic device 900. A reference signal may be generated in step 910. In step 912, the reference signal may be mixed with an audio signal. The mixed audio and reference signal may be output through a loudspeaker in step 914. The reference signal transmitted through the loudspeaker may be detected by a microphone in step 916. The reference signal may be analyzed and acoustic leakage or acoustic coupling parameters extracted in step 918. The leakage parameters may be compared with a previously sampled leakage parameter in step 920. If the acoustic leakage has increased by more than a predetermined threshold value in step 920 then the gain and/or equalization of the audio signal may be increased to compensate for the increased leakage in step 924. The method then returns to step 916 and the detection and parameter extraction cycle may be repeated. If the check in step 920 indicates the acoustic leakage has not increased then a check is made to determine whether the leakage has decreased by an amount greater than a threshold value in step 922. If the acoustic leakage has decreased by more than a threshold value then the gain and/or equalization of the audio signal may be decreased in step 926. The method then returns to step 916 and the detection and parameter extraction cycle may be repeated. If the acoustic leakage has not decreased then the gain and equalization settings may be maintained in step 928. The method then returns to step 916 and the detection and parameter extraction cycle may be repeated.

A portable electronic device may be a cordless phone, a mobile phone, a smart-phone, a headset, and a tablet computer.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that crew claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An acoustic coupling sensor for a portable electronic device, the acoustic coupling sensor comprising:
   an acoustic transmitter,
   an acoustic sensor,
   a reference signal generator coupled to the acoustic transmitter and configured and arranged to generate a reference signal having a frequency band limited relative to audio signal transmissions by the acoustic transmitter,
   at least one further acoustic sensor, and
   a level detector configured with circuitry and coupled to the acoustic sensor, the level detector being configured to combine signals representative of the reference signal as received by the acoustic sensor and the at least one further acoustic sensor and to output a control signal which is indicative of a value or level of acoustic coupling between the acoustic transmitter, the acoustic sensor and the at least one further acoustic sensor, and wherein in operation, the reference signal generator is operable to transmit the reference signal to the acoustic transmitter, the acoustic transmitter is operable to transmit the reference signal along with an audio signal and the acoustic sensor is operable to detect an acoustic level of the transmitted reference signal; and
   a computer processor configured and arranged to adjust a gain of another audio signal input to the acoustic transmitter responsive to an output control signal being indicative of a change in the reference signal level being greater than a threshold value.

2. The acoustic coupling sensor of claim 1, wherein the acoustic sensor including circuitry configured to sense the transmitted reference signal, wherein the level detector is operable to detect an acoustic level of the transmitted reference signal via the acoustic sensor, and wherein the detected reference signal level corresponds to a value of acoustic coupling between the acoustic transmitter and the acoustic sensor.

3. The acoustic coupling sensor of claim 1, wherein the acoustic sensor is positioned at a fixed location with respect to the acoustic transmitter, and wherein the reference signal generator is further configured to generate the reference signal as a band-limited signal having a frequency of greater than 3 kHz.

4. The acoustic coupling sensor of claim 1, wherein the reference signal generator is configured to generate a band-limited signal having a frequency greater than one octave above a resonant frequency of the acoustic transmitter.

5. The acoustic coupling sensor of claim 1, wherein the reference signal generator is configured to generate a band-limited ultrasound signal.

6. The acoustic coupling sensor of claim 1, wherein the acoustic sensor comprises a microphone.

7. The acoustic coupling sensor of claim 1, wherein the acoustic transmitter comprises a loudspeaker.

8. An audio apparatus comprising the acoustic coupling sensor of claim 7, and further comprising a mixer coupled to the processor and the reference signal generator, and wherein the processor is further operable to output an audio signal and the audio apparatus is operable to output a mix of the audio signal and the reference signal via the loudspeaker.

9. The audio apparatus of claim 8, wherein the processor is configured to adapt at least one of the gain, the equalization and the dynamic range compression of the audio signal in response to a change in an acoustic coupling value.

10. The audio apparatus of claim 8, wherein the audio apparatus is a portion of a portable electronic device.

11. The portable electronic device of claim 10, wherein in a voice communication mode of operation, a receiver loudspeaker is operable as the acoustic transmitter and a microphone used for speech input is operable as the acoustic sensor.

12. The portable electronic device of claim 10, further including a level detector, including a circuit, configured to output a signal that corresponds to a value of acoustic coupling between the acoustic transmitter and the acoustic sensor based on a change in the acoustic level of the transmitted reference signal.

13. The portable electronic device of claim 12, wherein the processor is configured to receive the output and:
increase a gain of a subsequent audio signal output to the acoustic transmitter in response to the acoustic coupling value indicating an increase in acoustic leakage that is greater than a first threshold; and
decrease a gain of the subsequent audio signal output to the acoustic transmitter in response to the acoustic coupling value indicating a decrease in acoustic leakage that is greater than a second threshold.

14. The portable electronic device of claim 12, wherein the level detector is further configured to compare the change in the acoustic level of the transmitted reference signal with respect to a known level to determine the acoustic coupling value.

15. The acoustic coupling sensor of claim 1, wherein at least one of the acoustic sensor and the acoustic transmitter comprises a piezo-electric transducer.

16. The acoustic coupling sensor of claim 1, wherein the acoustic coupling sensor is a portion of a portable electronic device.

17. An acoustic coupling sensor for a portable electronic device, the acoustic coupling sensor comprising:
an acoustic transmitter,
a microphone operable as an acoustic sensor,
a reference signal generator coupled to the acoustic transmitter and configured and arranged to generate a reference signal having a frequency band limited relative to audio signal transmissions by the acoustic transmitter, wherein the reference signal has a frequency that is above a resonant frequency of the acoustic transmitter,
at least one further microphone and a level detector, including a circuit, the at least one further microphone coupled to the level detector, wherein the level detector is configured to combine the reference signal sensed via the microphone and the at least one further microphone and to output a control signal, wherein the control signal corresponds to a value of acoustic coupling between the acoustic transmitter, the microphone and the at least one further microphone, wherein in operation, the reference signal generator is operable to transmit the reference signal to the acoustic transmitter, the acoustic transmitter is operable to transmit the reference signal along with an audio signal, and the acoustic sensor is operable to detect an acoustic level of the transmitted reference signal, and
a processor configured and arranged to adjust a gain of another audio signal input to the acoustic transmitter responsive to an output control signal being indicative of a change in the reference signal level being greater than a threshold.

18. A method for detecting acoustic coupling for a portable electronic device, the method comprising the steps of:
generating a reference signal,
transmitting the reference signal along with an audio signal through an acoustic transmitter,
detecting a reference signal level of the transmitted reference signal outputted from the acoustic transmitter by an acoustic sensor, wherein the reference signal is a band-limited signal having a frequency greater than one octave above a resonant frequency of the acoustic transmitter, and
adjusting a gain of an audio signal inputted to the acoustic transmitter in response to a change in the reference signal level being greater than a threshold value, and
using at least one further acoustic sensor coupled to a level detecting circuit with the level detecting circuit operating to combine the reference signal received via the acoustic sensor and the at least one further acoustic sensor and to output a control signal which corresponds to a value of acoustic coupling between the acoustic transmitter, the acoustic sensor and the at least one further acoustic sensor, and wherein an output control signal is indicative of the change in the reference signal level being greater than the threshold value.

19. The method of claim 18, further including mixing the reference signal with an audio signal via mixer circuitry of the portable electronic device, and transmitting the mixture of the reference signal with the audio signal via the acoustic transmitter.

20. A method for detecting acoustic coupling for a portable electronic device, the method comprising the steps of:
generating a reference signal;
mixing the reference signal with an audio signal via mixer circuitry of the portable electric device;

transmitting the mixture of the reference signal with the audio signal through an acoustic transmitter of the portable electric device;

detecting a reference signal level via an acoustic sensor of the portable electric device, including
- comparing a change in the acoustic level of the transmitted reference signal with respect to a known level, and
- outputting a control signal that corresponds to a value of acoustic coupling between the acoustic transmitter and the acoustic sensor based on the comparison; and
- adjusting a gain of another audio signal in response the change in the reference signal level being greater than a threshold value; and using at least one further acoustic sensor coupled to a level detecting circuit with the level detecting circuit operating to combine the reference signal received via the acoustic sensor and the at least one further acoustic sensor and to output the control signal which corresponds to the value of acoustic coupling between the acoustic transmitter, the acoustic sensor and the at least one further acoustic sensor and wherein an output control signal is indicative of the change in the reference signal level being greater than the threshold value.

21. The method of claim 20, further including:

outputting the audio signal to the mixer circuitry via a processor of the portable electronic device, and determining the change in the reference signal level is greater than the threshold value based on the output control signal corresponding to the acoustic coupling value.

* * * * *